(12) United States Patent
Lewis-Bowen et al.

(10) Patent No.: US 7,546,546 B2
(45) Date of Patent: Jun. 9, 2009

(54) USER DEFINED CONTEXTUAL DESKTOP FOLDERS

(75) Inventors: Alister Lewis-Bowen, Cambridge, MA (US); Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 11/210,924

(22) Filed: Aug. 24, 2005

(65) Prior Publication Data

US 2007/0050727 A1 Mar. 1, 2007

(51) Int. Cl.
G06F 3/00 (2006.01)
G06F 3/048 (2006.01)
(52) U.S. Cl. .................. 715/774; 715/775; 715/853
(58) Field of Classification Search .................. 715/765, 715/813, 817, 853
See application file for complete search history.

(56) References Cited

U.S. PATENT DOCUMENTS

| | | | |
|---|---|---|---|
| 6,691,282 B1 | 2/2004 | Rochford et al. ............ 715/514 |
| 7,010,755 B2 | 3/2006 | Anderson et al. | |
| 2002/0002607 A1* | 1/2002 | Ludovici et al. ............ 709/223 |
| 2003/0131016 A1 | 7/2003 | Tanny et al. ................. 707/102 |
| 2003/0189597 A1 | 10/2003 | Anderson et al. ........... 345/778 |
| 2004/0008229 A1 | 1/2004 | Hulterantz .................. 345/810 |
| 2004/0056903 A1* | 3/2004 | Sakai ......................... 345/853 |
| 2005/0125739 A1 | 6/2005 | Thompson | |
| 2007/0050727 A1 | 3/2007 | Lewis-Bowen et al. | |

OTHER PUBLICATIONS

JDSoft Virtual Desk 1.2—Virtual Desk Manager http://www.easyfp.com/virtualdesk.html 3 pages.
David Pogue, Craig Zacker, L.J. Zacker: "Windows XP Professional: The Missing Manual. First Edition. pp. 26, 59, 497-534, 563-611" Jan. 2003 (Jan. 2003), Pogue Press/O'Reilly, USA, XP002431117 the whole document.
Henderson D A et al: "Rooms: The Use of Multiple Virtual Workspaces To Reduce Space Contention In a Window-Based Graphical User Interface" ACM Transactions On Graphics, ACM, New York, NY, US, vol. 5, No. 3, Jul. 1, 1986 (Jul. 1, 1986), pp. 211-243, XP000600869 ISSN: 0730-0301 the whole document.
Ravasio Pamela et al: "In pursuit of desktop evolution: User problems and practices with modern desktop systems" Jun. 2004 (Jun. 2004), ACM Trans. Comput. -Hum Interact,; ACM Transactions on Computer-Human Interaction Jun. 2004, vol. 11, NR. 2, pp. 156-180, XP002431118 the whole document.
Bao Xinlong et al: "Fewer clicks and less frustration: Reducing the cost of reaching the right folder" Jan. 29, 2006 (Jan. 29, 2006), Int Conf Intell User Interfaces Proc IUI: International Conference on Intelligent User Interfaces, Proceedings IUI; IUI Jun. 2006,pp. 178-185, XP002431119 paragraphs [0001], [0006], [0008]; figure 4.

(Continued)

*Primary Examiner*—Weilun Lo
*Assistant Examiner*—Truc T Chuong
(74) *Attorney, Agent, or Firm*—John E. Campbell

(57) ABSTRACT

Contextual desktop folders are provided in addition to a system desktop folder, thereby customized desktop folders (contextual desktop folders) are provided to a user. Thus, applications that have for example editing dialogs presented via a GUI interface, can have the dialogs customized for a computing environment providing dialog functions associated with predetermined applications. Preferably, a user or application selects files of a contextual desktop to present to the user of the application as "default" files, folders, shortcuts or applications.

20 Claims, 16 Drawing Sheets

OTHER PUBLICATIONS

International Search Report PCT1 PCT/EP2006/065650 Filing Date Aug. 24, 2006 Mailing Date Oct. 5, 2007 16 pages.

Kaptelinin Victor: "UMEA: Translating interaction histories into project contexts" 2003, Conf Hum Fact Comput Syst Proc; Conference On Human Factors in Computing Systems - Proceedings 2003, pp. 353-360, XP002431116 abstract, fiugres 1-5 p. 355, col. 1, paragraph 2 - p. 359, col. 2, last paragraph.

* cited by examiner

USER DEFINED CONTEXTUAL DESKTOP FOLDERS

FIELD OF THE INVENTION

The present invention relates to the field of graphic user interfaces (GUIs) within computer systems. More specifically, the present invention relates to a GUI that is integrated into a computer operating system that enables the user to easily access particular sets of files in the file system of that computer.

BACKGROUND OF THE INVENTION

In today's operating systems there is no notion of a context or current working folder. Each application (application program) must manage this independently. Some applications manage it well and others not so well. In addition, it is cumbersome when switching between applications because each application has its own notion of what is the current directory. One way to achieve this cross application integration is through the system supplied user desktop. Most operating systems today (for example WINDOWS® operating system from Microsoft Corp.) have the notion of a user's desktop folder that allows the user to place files, folders, applications and shortcuts on a virtual space to allow easy access to those commonly used items.

This location is available in open and save dialog boxes for example, and is easily accessible across applications. The user can gain quick access to this location from any application.

The problem is that there is only one desktop. So the desktop fills up with unrelated content that makes its use less effective. This content includes but is not limited to files, applications, folders, shortcuts, etc. A solution is needed to facilitate the use of commonly accessed resources.

US Patent Application No. 20030131016A1 "Automated system and methods for determining the activity focus of a user a computerized environment" filed Sep. 27, 2002 and incorporated herein by reference discloses a system for collecting information regarding user activity in a computerized environment. The system in a descriptive embodiment, activity focus of the user is inferred. Then data is retrieved regarding the activity of the user. The system monitors the events occurring due to the interaction of the user and the computer system. Thus, the system is able to determine when the user changes activity focus.

This patent application discusses a user working with multiple files and types of information but does not provide a solution that enables a user to interactively control his desktop environment.

U.S. patent application Ser. No. 10/117,856 (Anderson et al.) filed Apr. 5, 2002 titled "Virtual desktop manager" incorporated herein by reference describes a method for a user to preview multiple virtual desktops in a graphical user interface is described. The method comprises receiving an indication from a user to preview the multiple virtual desktops and displaying multiple panes on the display. Each pane contains a scaled virtual desktop having dimensions that are proportionally less than the dimensions of a corresponding full-size virtual desktop. Each scaled virtual desktop displays with one or more scaled application windows as shadows if the corresponding full-size virtual desktop has one or more corresponding application windows that are active. The use of Virtual Desktops does not provide a way to ease management of resources for multiple application programs.

A method is needed to ease management of files, folders and other resources for multiple application programs in a computer system.

SUMMARY OF THE INVENTION

The present invention is directed towards providing customized desktops in addition to a system desktop such that a customized (contextual) desktop provided that is appropriate for the activity or job in which the user is currently engaged. In this way, the objects with the highest likelihood of being relevant will be the most easily accessed objects in the file system. The ability to arbitrarily assign to any folder in the system, a customized desktop role is what we call the "contextual desktop" (CDT).

In one aspect of the invention a computer system has a system desktop for general use by applications. The computer system provides the capability to create contextual desktops to augment the system desktop. The contextual desktops are preferably presented to the user in the form of an icon on the display of the system view, in addition to the system desktop icon.

It is therefore an object of the invention to provide, via an operating system of a computer system, a system desktop view at a computer display of the computer system wherein a first contextual desktop folder (the system desktop) of one or more contextual desktop folders is created. When first contextual desktop folder is made current, default file operations of an application program of the computer system are directed to the first contextual desktop folder.

It is a further object of the invention to create a second contextual desktop folder of the one or more contextual desktop folders and to provide at the computer display, a GUI interface for managing the second contextual desktop folder of the one or more contextual desktop folders.

It is yet another object of the invention, in response to receiving a GUI directive selecting the second contextual desktop folder by way of the GUI interface, to make current the second contextual desktop folder of the one or more contextual desktop folders, whereby the default file operations of an application program of the computer system are directed to the second contextual desktop folder.

It is another object of the invention to make the second contextual desktop folder the only current contextual desktop folder of the computer system.

In a further object of the invention when the second contextual desktop folder of the one or more contextual desktop folders is the current contextual desktop folder, in response to receiving a GUI directive selecting the first contextual desktop folder by way of the GUI interface, thereby making current the first contextual desktop folder of the one or more contextual desktop folders, whereby the default file operations of an application program of the computer system are directed to the second contextual desktop folder.

It is another object of the invention to present at the system desktop view a GUI representation of the one or more contextual desktop folders.

It is still another object of the invention to provide a GUI representation consists of any one of a contextual desktop separation bar, a highlighted contextual desktop, one or more tab widgets, a menu of one or more widgets or one or more icon widgets.

It is another object of the invention to provide a contextual desktop folder containing information consisting of any one of a file, a folder, shortcut (alias) or an application program file of the computer system.

It is yet another object of the invention to provide a contextual desktop folder consisting of any one of the first contextual desktop folder or the second contextual desktop folder, is a file system folder containing any one of a file, a folder, shortcut (alias) or an application program file of the computer system.

It is yet another object of the invention to provide a creating the second contextual desktop folder step comprising the further steps of prompting a user to create a new contextual desktop folder, by way of the GUI interface, whereby responsive to the GUI prompt, a GUI directive to make a system folder a new contextual desktop folder is received.

It is yet another object of the invention to, by way of the GUI interface, receive a GUI management directive for managing the second contextual desktop folder, the GUI management directive consisting of any one of a file save operation, a file print operation, a file open operation, a find file operation, a make a new contextual desktop folder operation or a make current a contextual desktop folder operation.

It is yet another object of the invention to provide default file operations of the application consisting of any one of a file save operation, a file print operation or a file open operation, a find file operation.

It is yet another object of the invention to communicate current contextual desktop folder information between the operating system of the computer system and an application program of the computer system by way of an API.

It is yet another object of the invention to simultaneously present contents of both the first and second contextual desktop folder at the computer display.

It is yet another object of the invention to provide a system API to access the value of the current contextual desktop folder and use that folder to support the user in file dialogs, the file dialogs comprising any one of open file, save file, edit file, enable, disable or delete file.

It is yet another object of the invention, when the enable dialog is selected, to enable the current desktop folder to provide contextual desktop functions, and when the disable dialog is selected, to disable the current desktop folder so the file dialogs ignore the contextual desktop functions.

It is yet another object of the invention to provide contents of the current desktop folder comprising shortcuts (or aliases) to folders, files and applications thereby enabling those folders, files and applications to be contained in multiple contextual desktop folders simultaneously.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS:

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF THE PREFERED EMBODIMENTS

Figure 1:
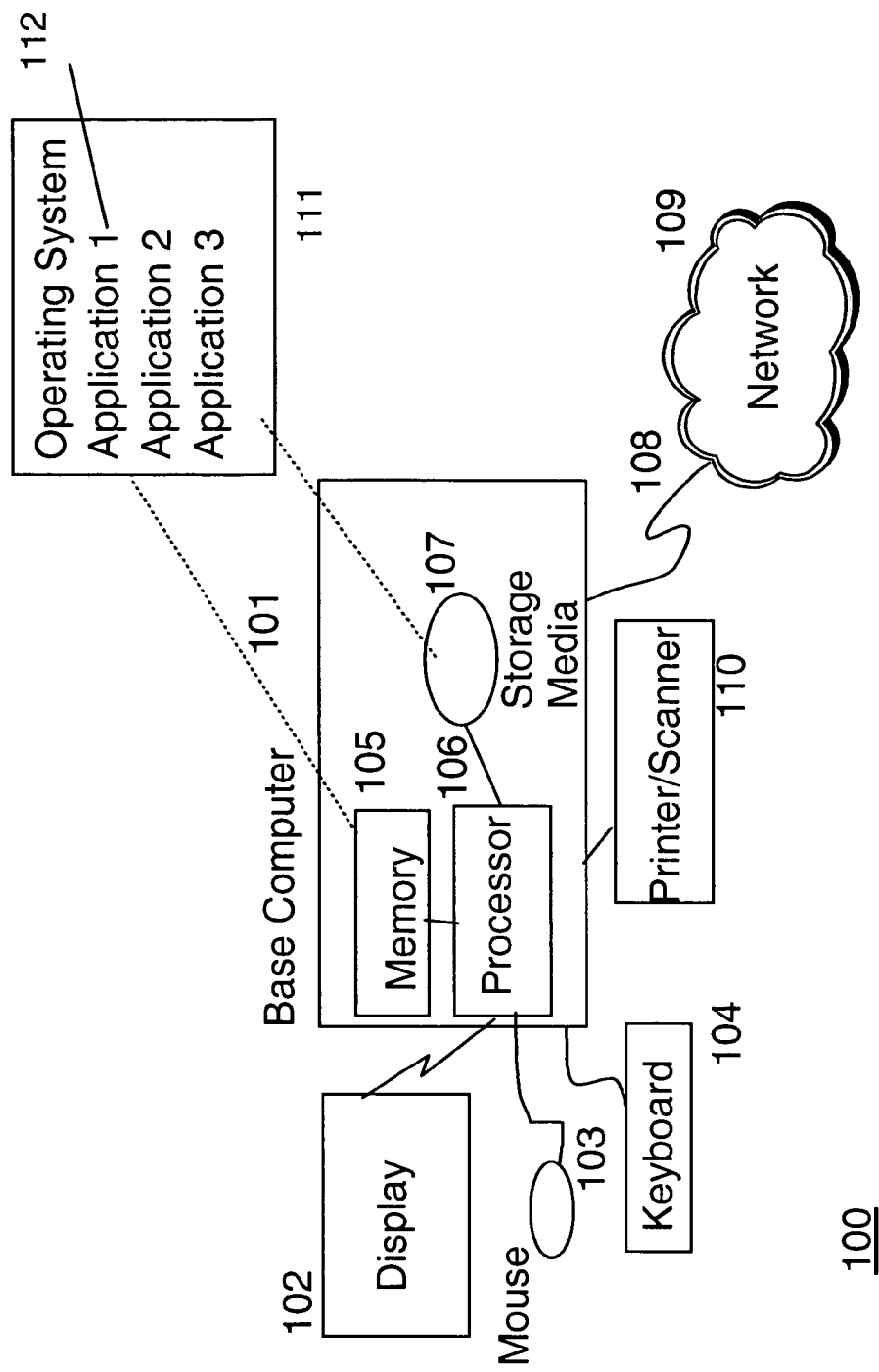
FIG. 1 is a diagram depicting components of a prior art computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
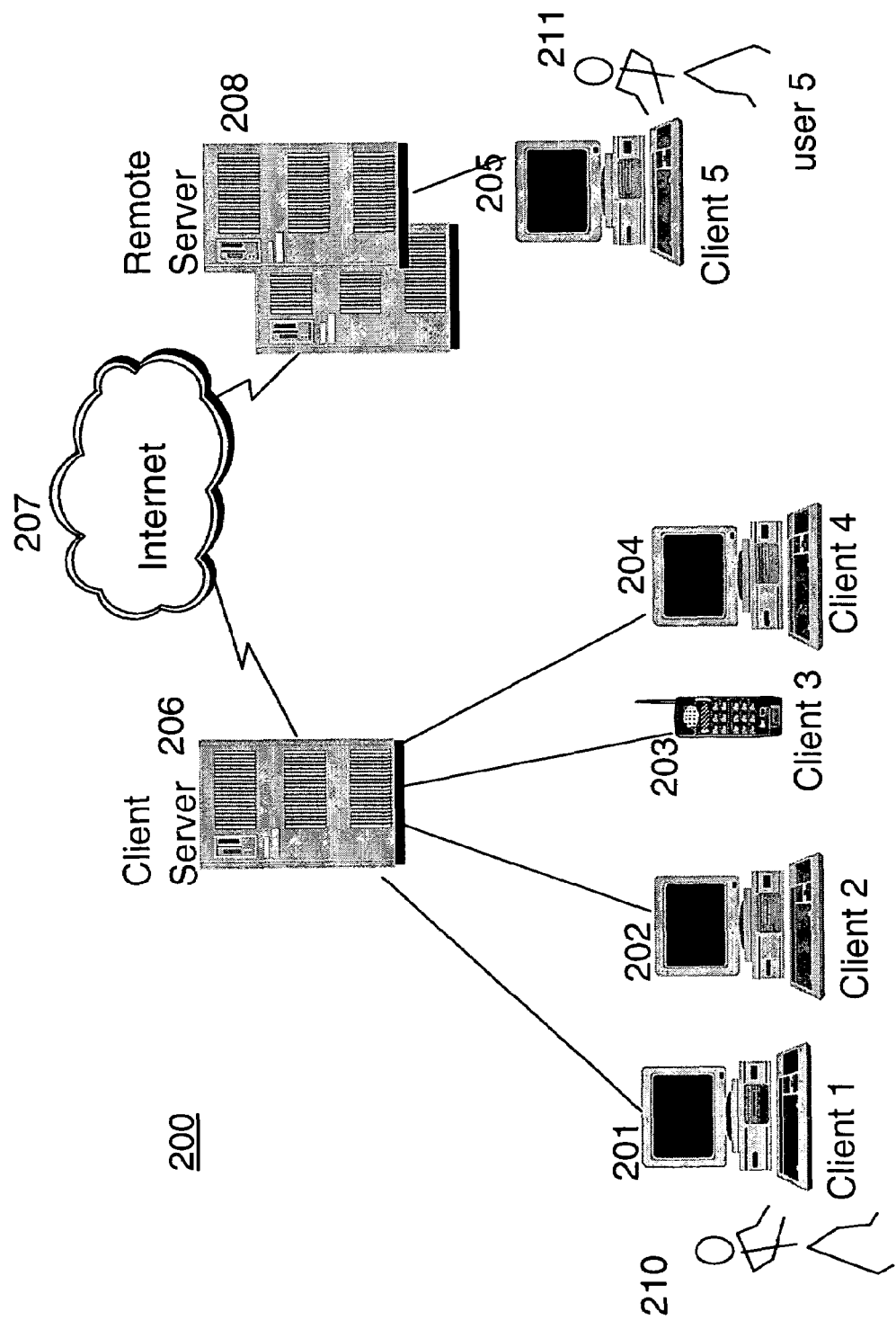
FIG. 2 is a diagram depicting a network of prior art computer systems.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zSeries® 900 Server available from IBM Corp.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system, which controls the function and interaction of the various computer components and one or more application programs. Program code is normally paged from dense storage media 107 to high-speed memory 105 where it is available for processing by the processor 106. The techniques and methods for embodying software programming code in memory, on physical media, and/or distributing software code via networks are well known and will not be further discussed herein.

In the following detailed description contextual desktops, of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention allows any folder to take on the role of the currently focused desktop i.e., the contextual desktop (CDT). Then, in file save and open dialogs, this contextual desktop will be immediately accessible and it will ease user and application supported processes including the file opening and saving process, preferably across applications. In addition, the content of the system-defined user's desktop can be merged with the contextual desktop. This allows the user to easily view both the normal desktop icons, like the trash icon, and the current folder's files in the space of the traditional desktop. A visual distinction preferably would be provided to highlight the difference between the traditional and contextual desktop items. This could take the form of a distinct background, color of the icons and other methods known in the art.

Typically desktops would be spatially distinct as well and may even utilize a splitter bar to hide one set of desktop icons and only reveal the desktop icons necessary for the current CDT.

In an example embodiment, the standard open (and close) dialogs include a button in the left column to quickly access the contextual desktop of one or more CDT's available to the user. This is shown in the FIG. 3B and FIG. 3C. Contextual desktops could be named by the user in a meaningful way so that they are presented to the user unambiguously. In a preferred embodiment, where no subdirectories exist within the current contextual desktop, there would be no need for the save dialog at all. The CDT aware application in an embodiment has a menu item with appropriate feedback and confirmation, to save (or open) the file to the current CDT. The contextual desktop can be thought of as a shortcut, or an alias, for the real folder that exists somewhere else on the disk.

Figure 3A:
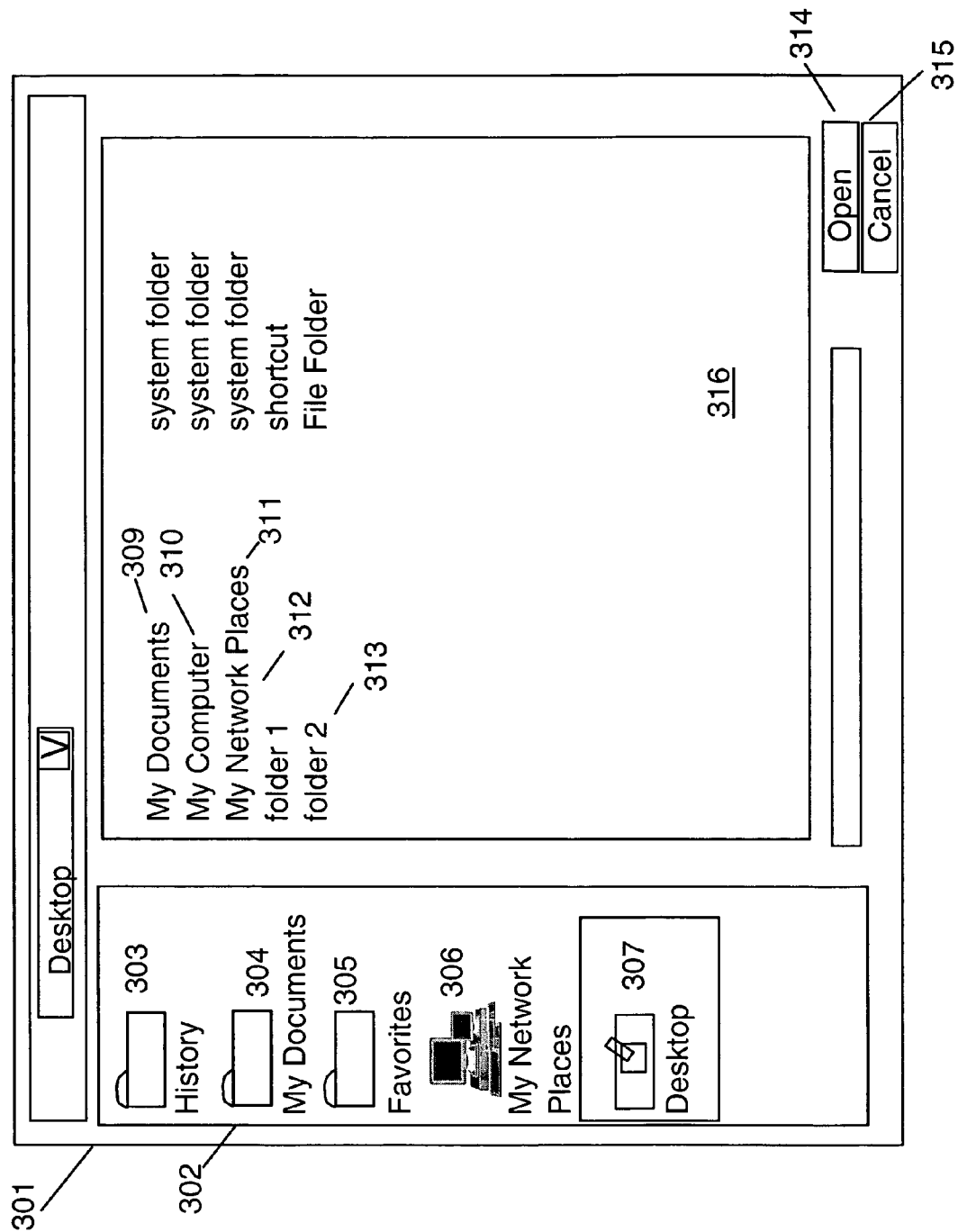
FIG. 3A depicts an example file dialog view used in the prior art.

FIG. 3A depicts a view 301 according to the current state of the art in the open file dialog view. The dialog provides a button 307 in the left column 302 to access the files and folders on the system desktop 316. In the example, the desktop view 316 includes "My Documents" folder 309, "My Computer" folder 310, "My Network Places" folder 311, "Folder 1" shortcut 312 and "Folder 2", folder 313. The view 301 further includes other GUI items including radio buttons "Open" 314 and "Close" 315 for manipulating the view.

Figure 3B:
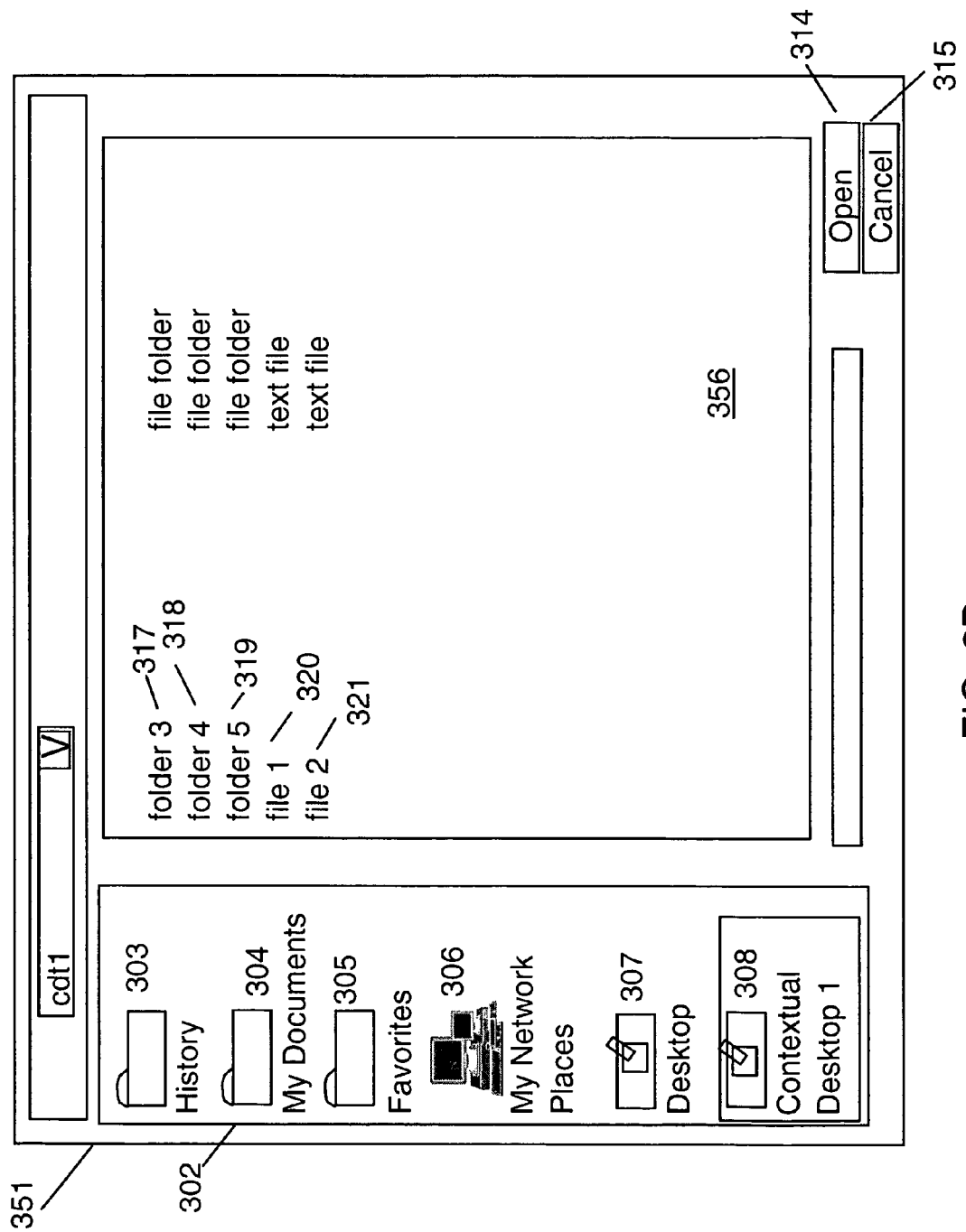
FIG. 3B depicts an example file dialog with a button to easily navigate to a current CDT.

FIG. 3B depicts the example view 351 using the contextual desktop in the open file dialog. As shown, there is a desktop folder widget 307 and an additional contextual desktop widget 308 displayed. Since the CDT 308 has been selected, it is highlighted by showing a box around the icon 308. The desktop view 356 displays items of the CDT 308. The items include "Folder 3", 317, "Folder 4" 318, "Folder 5" 319, "File 1" 320 and "File 2", 321.

Figure 3C:
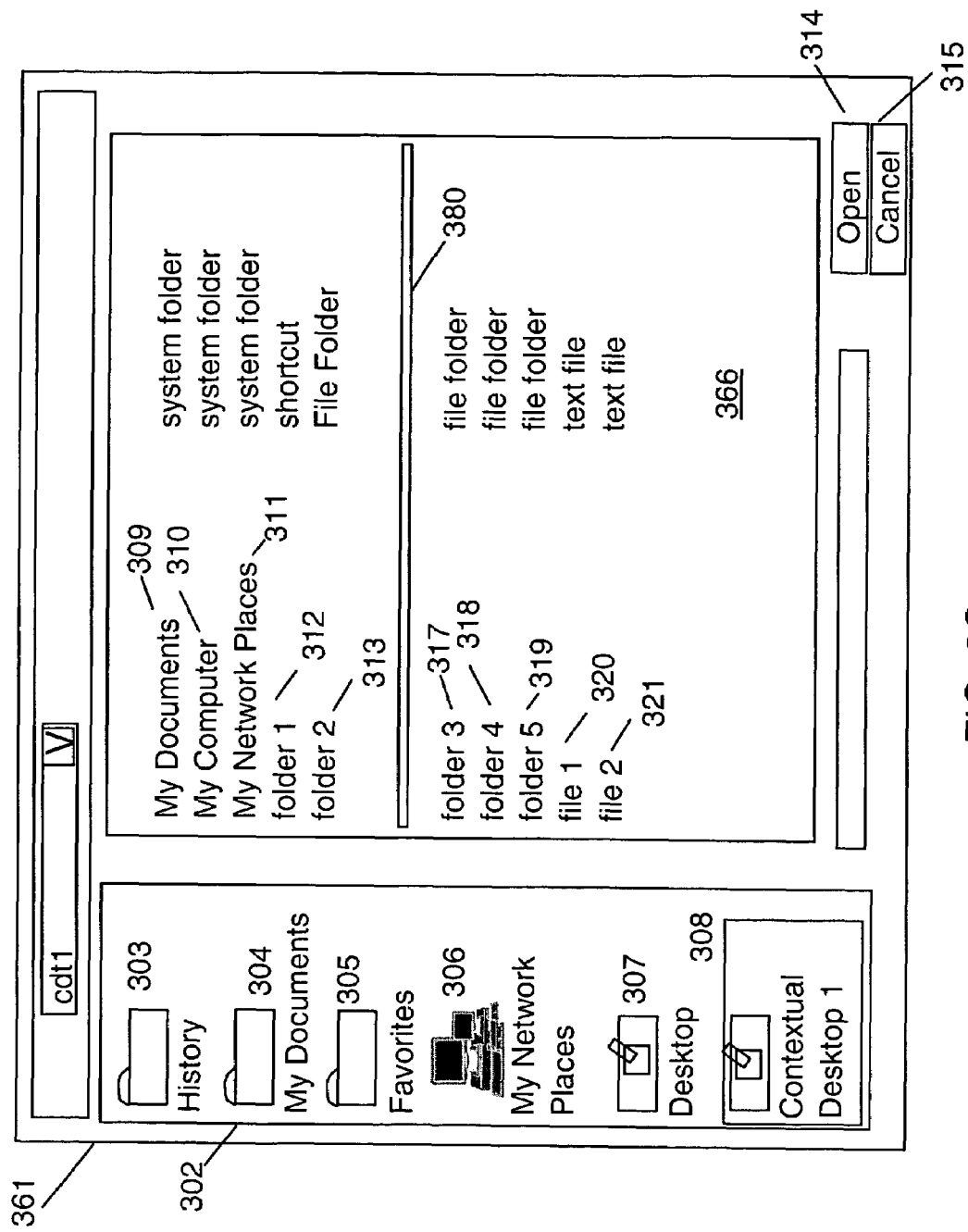
FIG. 3C depicts an example file dialog visually presenting a current CDT with a system desktop.

FIG. 3C depicts another example view 361 using the CDT in the open file dialog. In this view 361, the system's desktop files and folders 309 310 311 312 313 are displayed distinctly in a view 376, here above a separator line 380, while the files and folders of the current CDT 317 318 319 320 321 are displayed below the line 380.

Figure 3D:
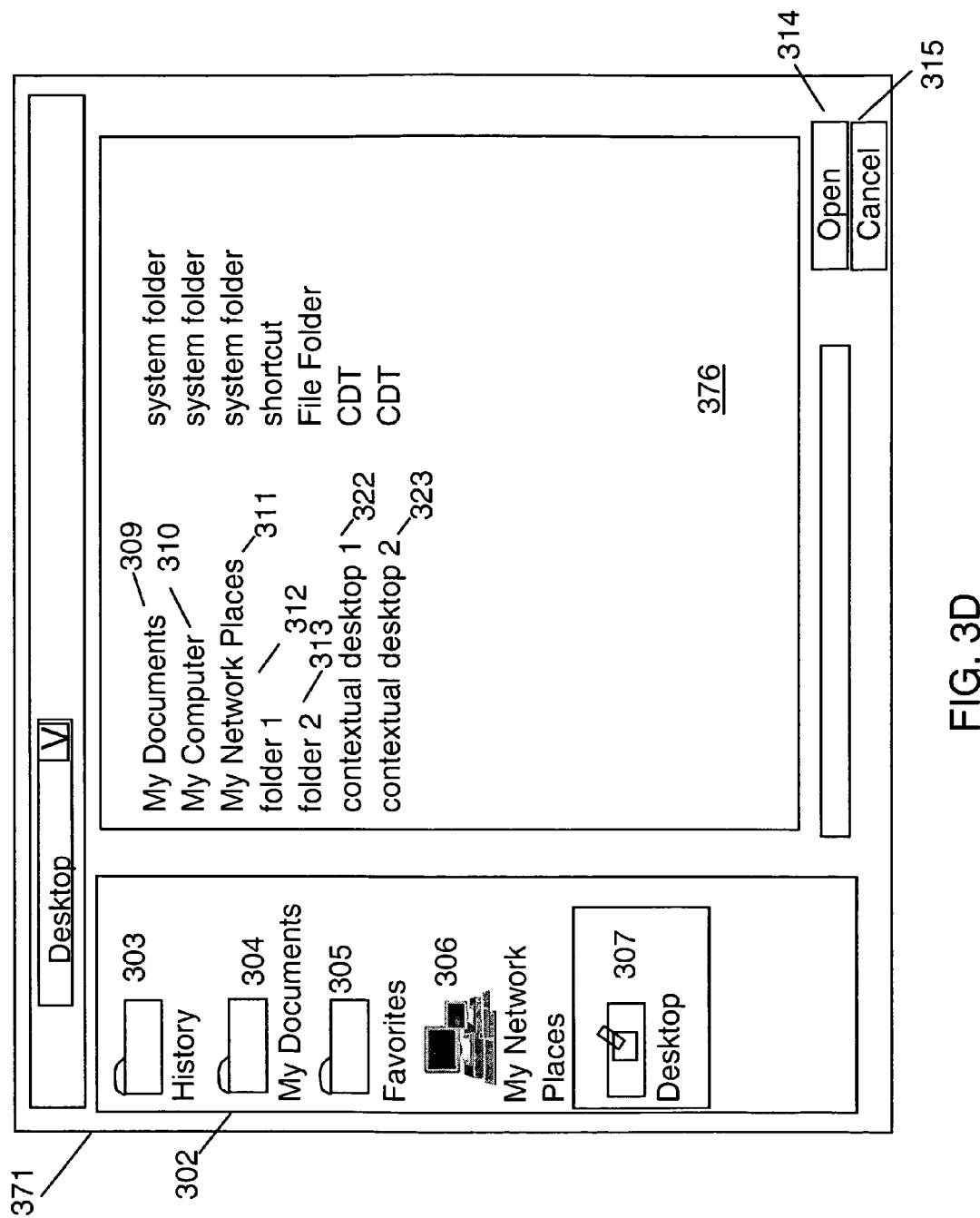
FIG. 3D depicts an example file dialog using a desktop button to present all defined CDTs combined with system desktop files and folders.

FIG. 3D depicts another example view 371 where the CDTs that are defined are displayed with the system desktop folders and files. This is similar to using shortcuts or aliases on the desktop.

Figure 4:
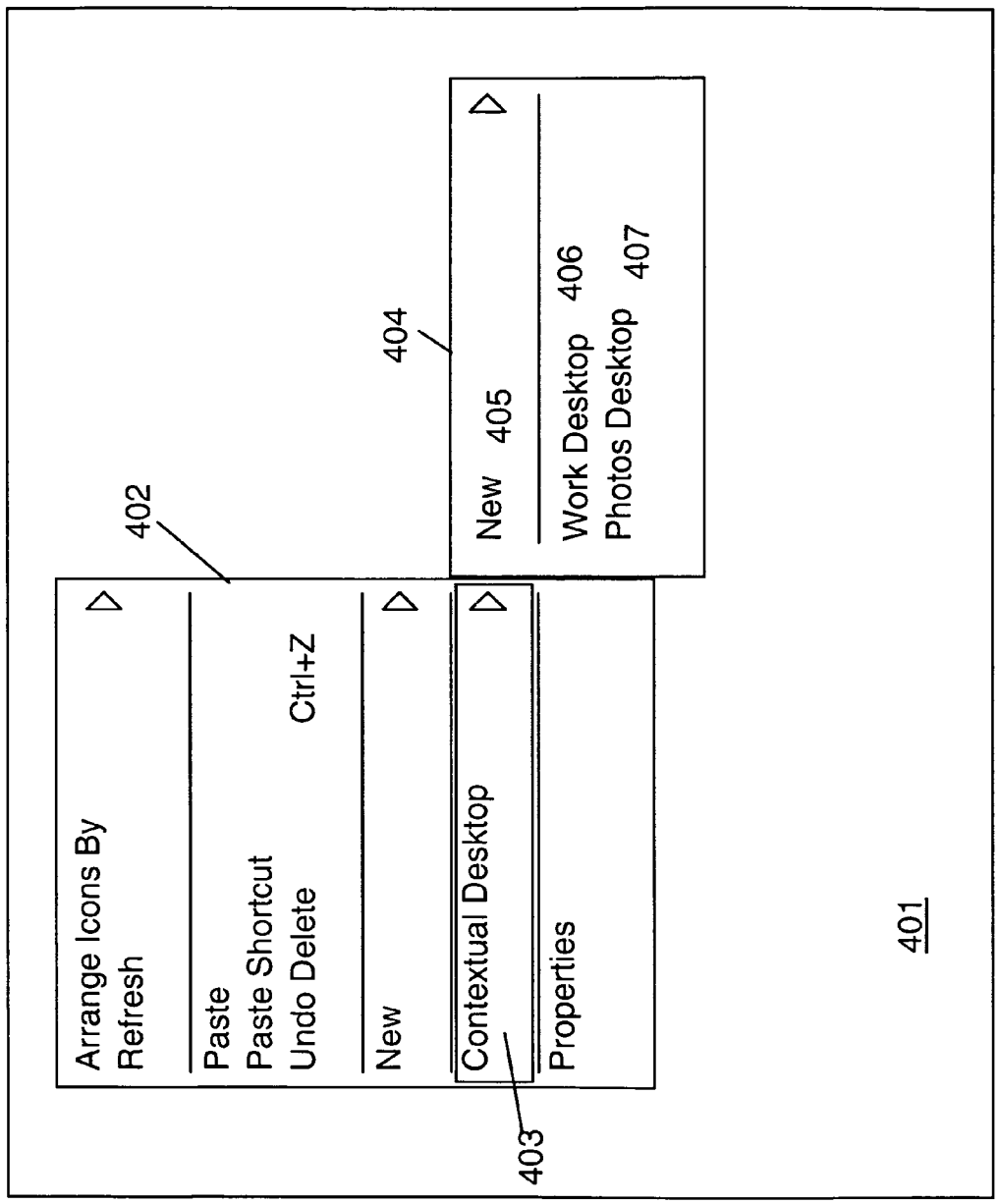
FIG. 4 depicts an example GUI interface for managing CDTs.

In an embodiment with reference to FIG. 4, to make a folder a contextual desktop, a user would right click on the folder representation and set the contextual desktop property. In another embodiment, the user could right click on a window background and get a context menu 401 That allows the user to choose the current contextual desktop from a list 402 of "favorite" desktops 406 407 or define 405 a new contextual desktop. In the example, the user navigates to the CDT menu 402 via an item (Contextual desktop 403) on a pull down menu 402.

If a folder which is currently being used as a contextual desktop is deleted, then the system desktop would be displayed instead. Alternatively, the previous contextual desktop could be set as the current contextual desktop.

In today's operating systems there is no notion of system-wide tasks and an associated working folder used in its context. Each application must manage this independently and some applications manage it well and others not so well. In addition, it is cumbersome when switching between applications because each application has its own notion of what is the current working directory. One way to achieve this cross application integration is through the system supplied user desktop.

Figure 5:
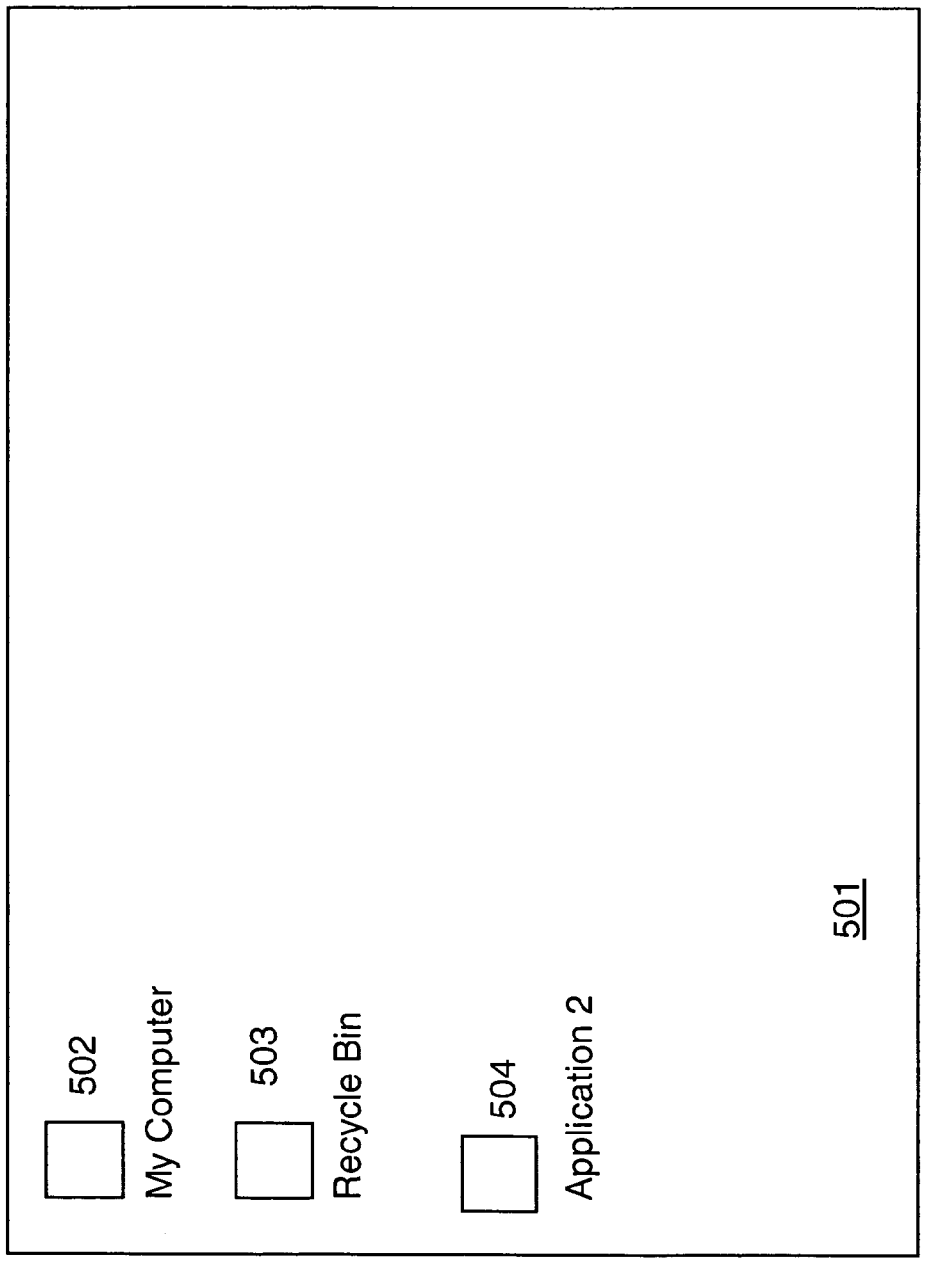
FIG. 5 depicts an example view of an example desktop folder of the prior art.

System Desktop:

Most operating systems today have the notion of a user's desktop folder that allows the user to place files, folders, applications and shortcuts to allow easy access to those commonly used items, FIG. 5. This location is available in open and save dialog boxes, FIG. 3A 307 and is easily accessible across applications. The user can gain quick access to this location from any application and use it as a file sharing location. Since there is only one desktop and users can't assign any folder as a desktop, users compensate by overloading the desktop with files, folders and aliases. However, the desktop quickly becomes littered with files, folders and aliases and becomes less useful because the user is now searching through a potentially large list of unrelated items. This also creates additional steps, i.e., clicking through a shortcut to access the relevant data. What is needed is a contextual desktop (CDT) that the user can define and change based on what activity or job they are doing. The contextual desktop is, in some sense, a shortcut for the real folder that exists somewhere else on the disk. CDTs, however, are designed to avoid clutter and annoying additional interaction steps.

Virtual Desktops:

In today's PC operating environments you can organize all your program windows into multiple desktop groups. These virtual desktops provide the user with more virtual desktop space to organize windows and applications into separate workspaces. With all your windows neatly categorized, you can then switch back and forth between them. This frees up your workspace and allows for a limited number of desktops to gain easy access to applications. This differs from contextual desktops (CDTs) of the present invention because CDTs allow you to use the existing file system to organize your files and provide easy access to them through open and save dialogs. Virtual desktops of the prior art, for example the aforementioned US Patent Application of Anderson et al. provides a limited number of desktop views, each desktop view comprises the system icons. A desktop view provides a GUI interface to applications associated with the desktop view. All desktop views share the same file system. This is reflected in the open and save dialogs of the application. A virtual desktop allows the user to organize their activities and windows. This does not support the user in the opening and closing of files in applications. In the present invention, the number of CDTs is potentially limitless and any folder in the file system can become a contextual desktop.

This invention allows any folder to take on the role of the contextual desktop. The desktop on a WINDOWS operating system, however, is fixed to a single system defined folder for each user. For a given user, the desktop folder is C:\Documents and Settings\User Name\Desktop. Our invention enables the operating system to set any folder to be assigned the role of CDT. With this invention, the context of a folder defined as a current CDT will be immediately accessible in file save and open dialogs. In many common work activities, users create different types of documents via different applications but store them in the same folder. With the current invention, this folder would be specified via the current CDT and the file opening and saving process will be greatly simplified.

Referring to FIG. 5, a prior art system desktop view 501 includes a "My Computer" icon 502, a "Recycle Bin" icon 503 and an Application 2" program 505.

Figure 6:
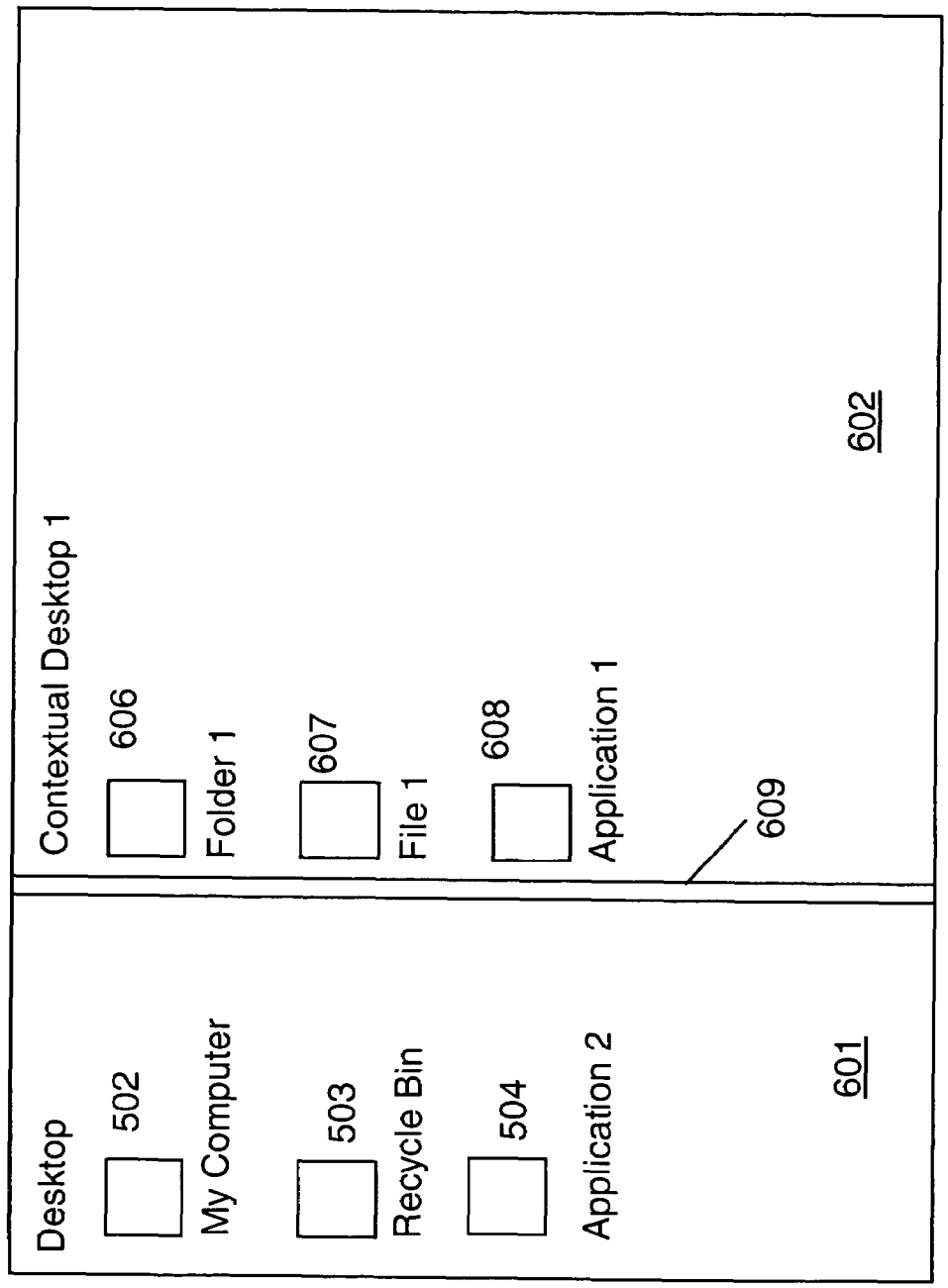
FIG. 6 depicts an example view of an example CDT.

The system-defined desktop is still useful and can work in conjunction with the CDTs of the present invention. Referring to FIG. 6, The system desktop 601 is preferably concurrently displayed with the contextual desktop 602. Through their presentation, each desktop is clearly identified. This allows the user to easily view both the normal desktop icons (like the trash icon) as well as the current CDTs files and folders in the space of the traditional desktop. A visual distinction is provided to highlight the difference between items from the system desktop and the current CDT. Each desktop is preferably presented uniquely with a distinct background, unique colors, under different tabs and other means known in the art. Typically these would be spatially distinct as well. For example, one technique may utilize a splitter bar to hide one set of desktop icons to only reveal the desktop icons necessary. One embodiment of a CDT viewed in conjunction with the normal system desktop utilizing a splitter bar 609. Here, the system desktop 601 comprises 3 icons: "My Computer" folder 603 "Recycle Bin" file 604 and "Application 2" program 605. The CDT "Contextual Desktop 1", 602 comprises 4 icons: "Folder 1" folder 606, "File 1" file 607 and "Application 1" program 608.

Figure 7:
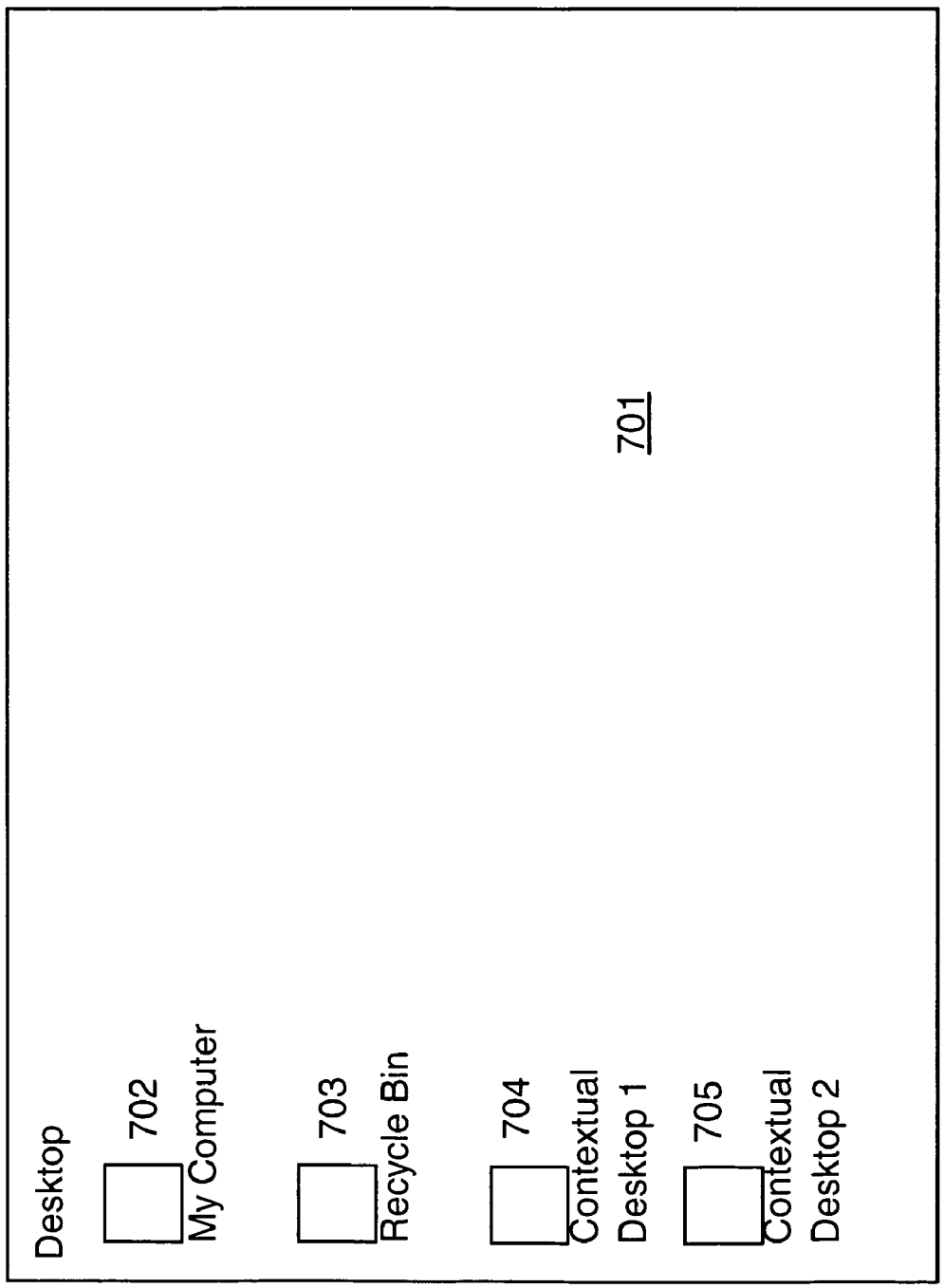
FIG. 7 depicts an example view for accessing CDT's.

FIG. 7 depicts contextual desktops shown as aliases on a system desktop view 701. The aliases include "Contextual Desktop 1" alias folder 704 and "Contextual Desktop 2" alias folder 705. The alias folders 704 705 are widgets for selecting a current CDT from the respective CDT's.

Figure 8:
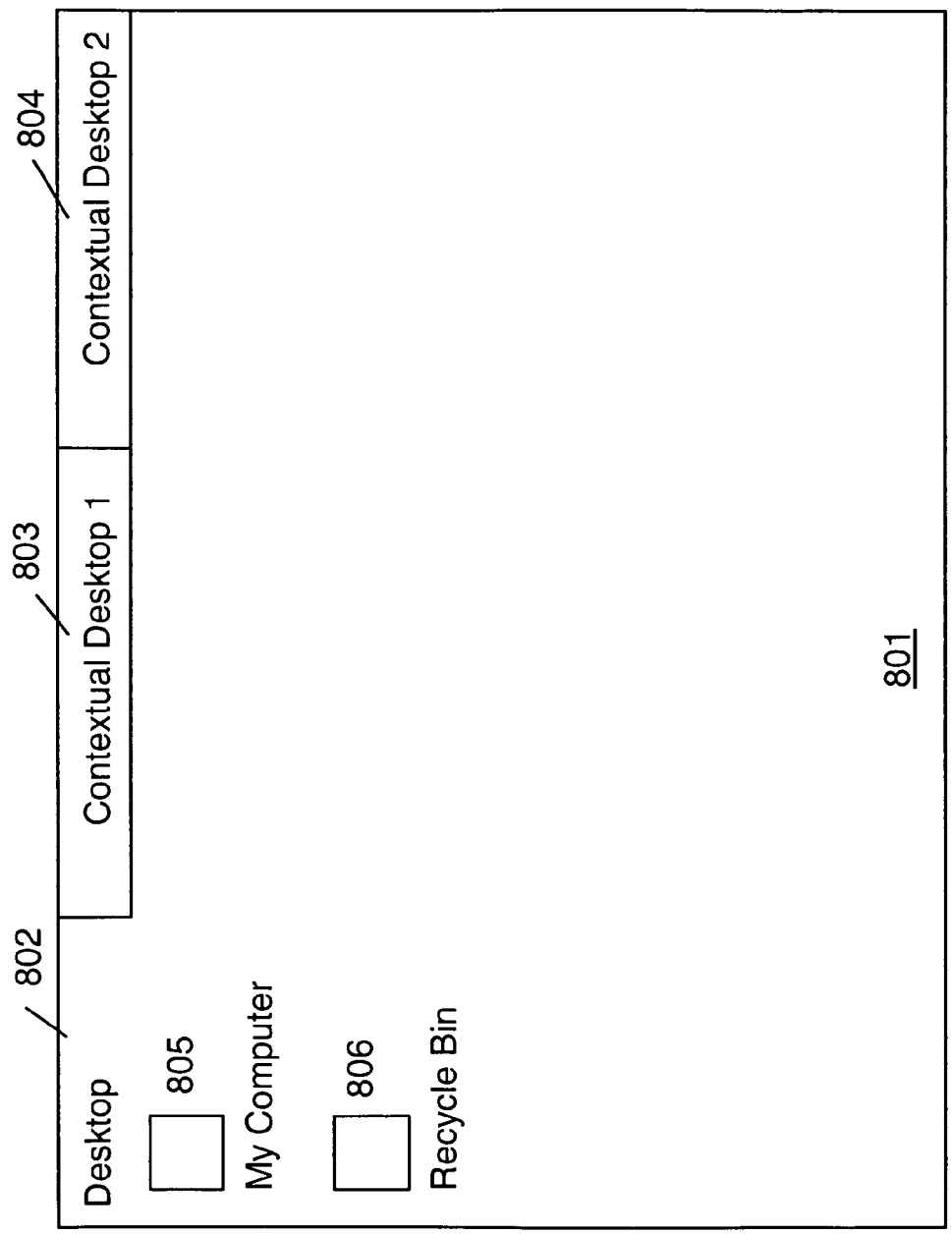
FIG. 8 depicts an example view for tabularly accessing CDT's.

FIG. 8 depicts an embodiment wherein each desktop is associated with a tab 802 803 804 displayed on the system desktop 801. The tabs in the example include a Desktop tab 802 for displaying the system desktop, a Contextual Desktop 1 tab 803 and a Contextual Desktop 2 tab 804.

Figure 9:
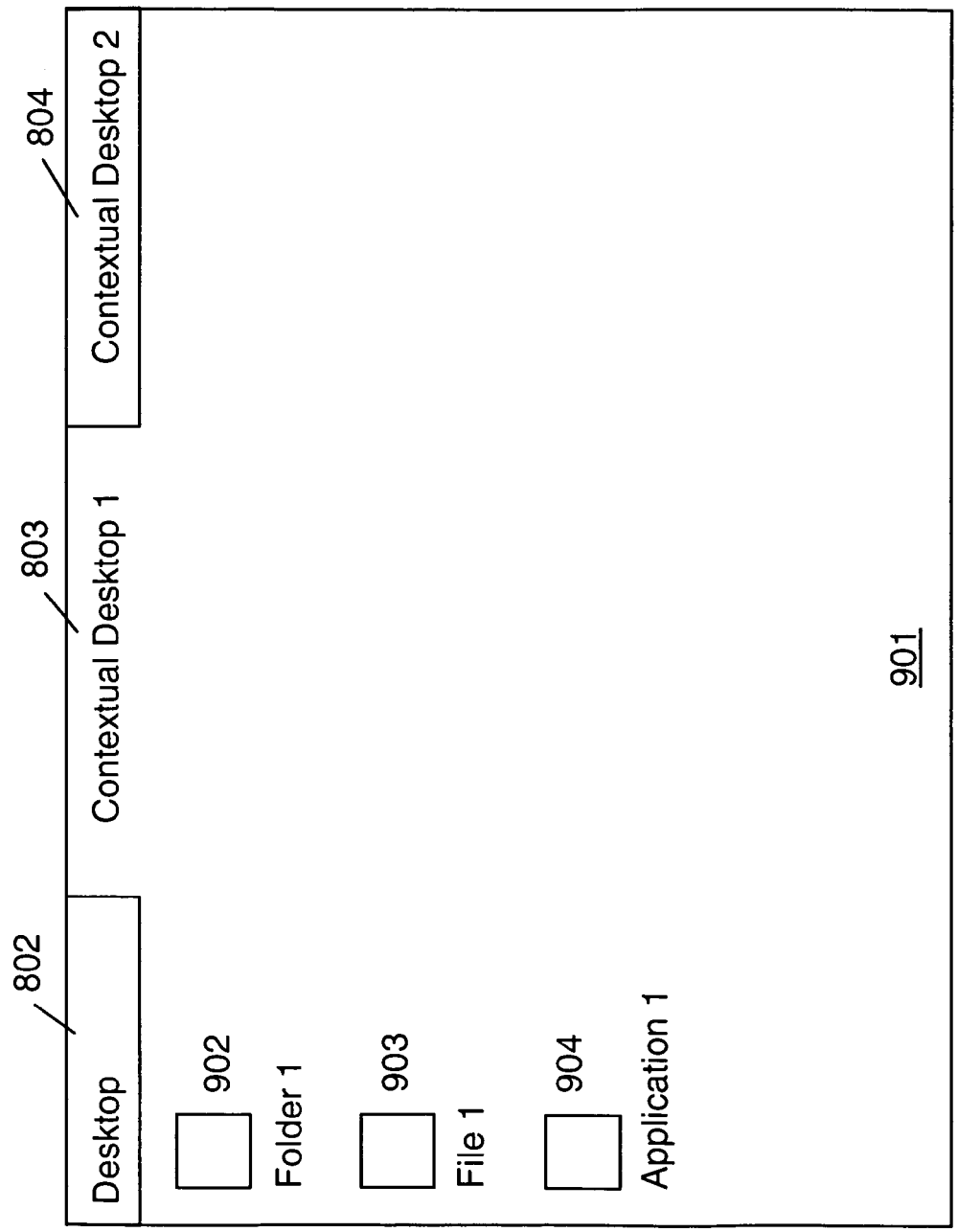
FIG. 9 depicts an example of tabularly accessing a CDT.

FIG. 9 depicts an example contextual desktop view 901, the view presented as a consequence of selecting the "contextual Desktop 1" tab 803 of FIG. 8 displays "Folder 1" folder 902, "File 1" file 903 and "Application 1" program 904.

Open and Close Dialogs:

In one embodiment, standard open and close dialogs now include an additional button 308 in the left column to quickly access a contextual desktop (referring to FIG. 3B and FIG. 3C depicting using the contextual desktop in the typical open dialog). Contextual desktops are preferably named in a meaningful way so that they are presented to the user unambiguously. Preferably, where no subdirectories exist within the current contextual desktop, there would be no need for a save dialog at all. The current application could just save to the current contextual desktop.

During file open operations, the CDT preferably opens to that location by default. Immediately the user is directed to the correct folder and does not have to hunt for the right files, folders or applications.

Cross Application Usage:

An important aspect of CDTs is in the context of cross application usage. When working on a specific task, typically there are many applications (MSWord™, Photoshop™, Excel™, etc) that one would change between to create different documents. All these documents belong conceptually to the same task and are preferably stored in the same folder. Unfortunately, the operating system (OS) does not support cross application contexts. The ability of an OS to provide contextual working directories based on the users task using CDTs will provide usability and productivity gains.

Defining and Switching CDTs:

In a preferred embodiment, with reference to FIG. 4, to make a folder a contextual desktop folder, one would right click on the folder, choose the option to create a new contextual desktop 405, which allows the user to name the desktop (the default is the folder's current name). Alternatively, the user could right click on the window's background and get a context menu 404 that allows the user to make current a contextual desktop from a list 404 of "favorite" desktops 406 407 previously defined (CDTs can also be shown as aliases on the system desktop). This menu 404 also allows 405 the user define a new CDT through a file browse dialog. In a preferred embodiment when a folder which is currently being used as a contextual desktop is deleted, then the system desktop would be displayed instead.

Figure 10:
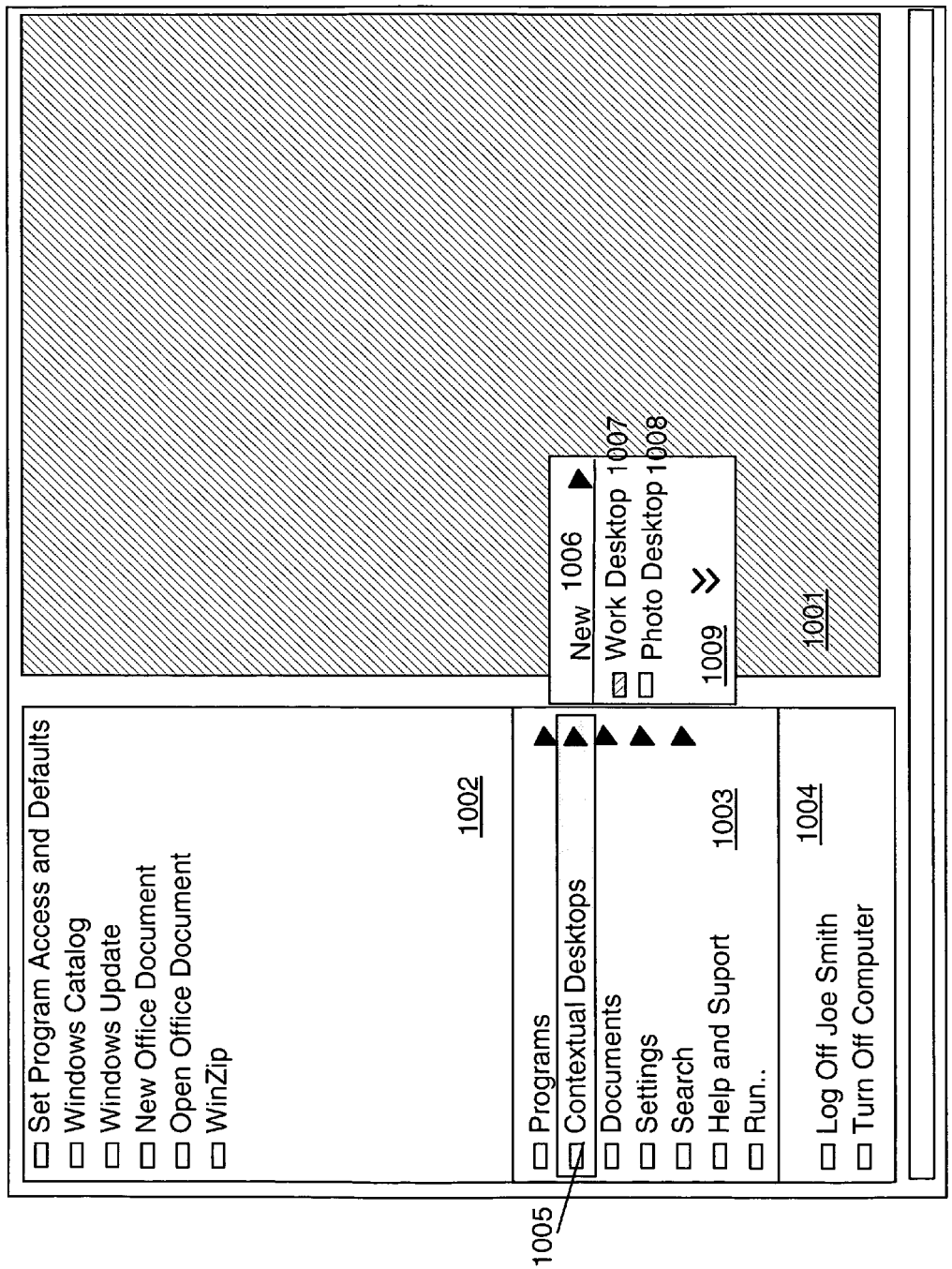
FIG. 10 depicts an example GUI view for managing CDT'S.

The user can preferably switch the CDT at anytime through a system accessible menu item. FIG. 10 shows a dialog window comprising a 3 part window 1002 1003 1004. In one part 1003, a widget "Contextual Desktops" 1005 when selected displays a window 1009 of menu items. The items include a "New" item 1009 for creating a new contextual desktop, a "Work Desktop" 1007 and "Photo Desktop" 1008 accessible on a Windows machine via the "Contextual Desktops" item 1005 in the Start Menu. The current CDT is preferably indicated in the list with a visual mark.

Application CDT Awareness:

In a simple case (referencing FIG. 3B), the application doesn't have to do anything to take advantage of the CDTS. In an embodiment, when an open dialog is requested, the system provides a resource 351 that includes a left column 302 of iconic buttons 303 304 305 306 307 308 that will enable the user, with one click, to switch to the currently defined CDT. In this case the application can use the CDTs through this system-supplied dialog. In a CDT aware application, when requesting a dialog, the application preferably sets the starting directory to the currently defined CDT. This requires an API in the operating system to return the currently defined CDT to the requesting application. In another embodiment, the use of CDTs are enabled or disabled through a user interface widget 308. This preference can automatically switch to the CDT in the dialogs without the applications knowledge.

Automatic Switching of CDTs:

The system preferably monitors what the user is doing and provides guides to help reset the CDT to a new likely location. In another embodiment, the system has its best guess of CDT stored in another location, an Automatic Contextual Desktop (ACDT). This ACDT is preferably based on the switching of applications and using the last known location used by an application. Preferably Labels or tooltips are used to help the user know where this new ACDT is so that it can be used without fear of misplacing the user's files.

Identifying the Current CDT:

The user can easily determine which actual folder is the current CDT through the start menu and the open and close dialogs.

Figure 11:
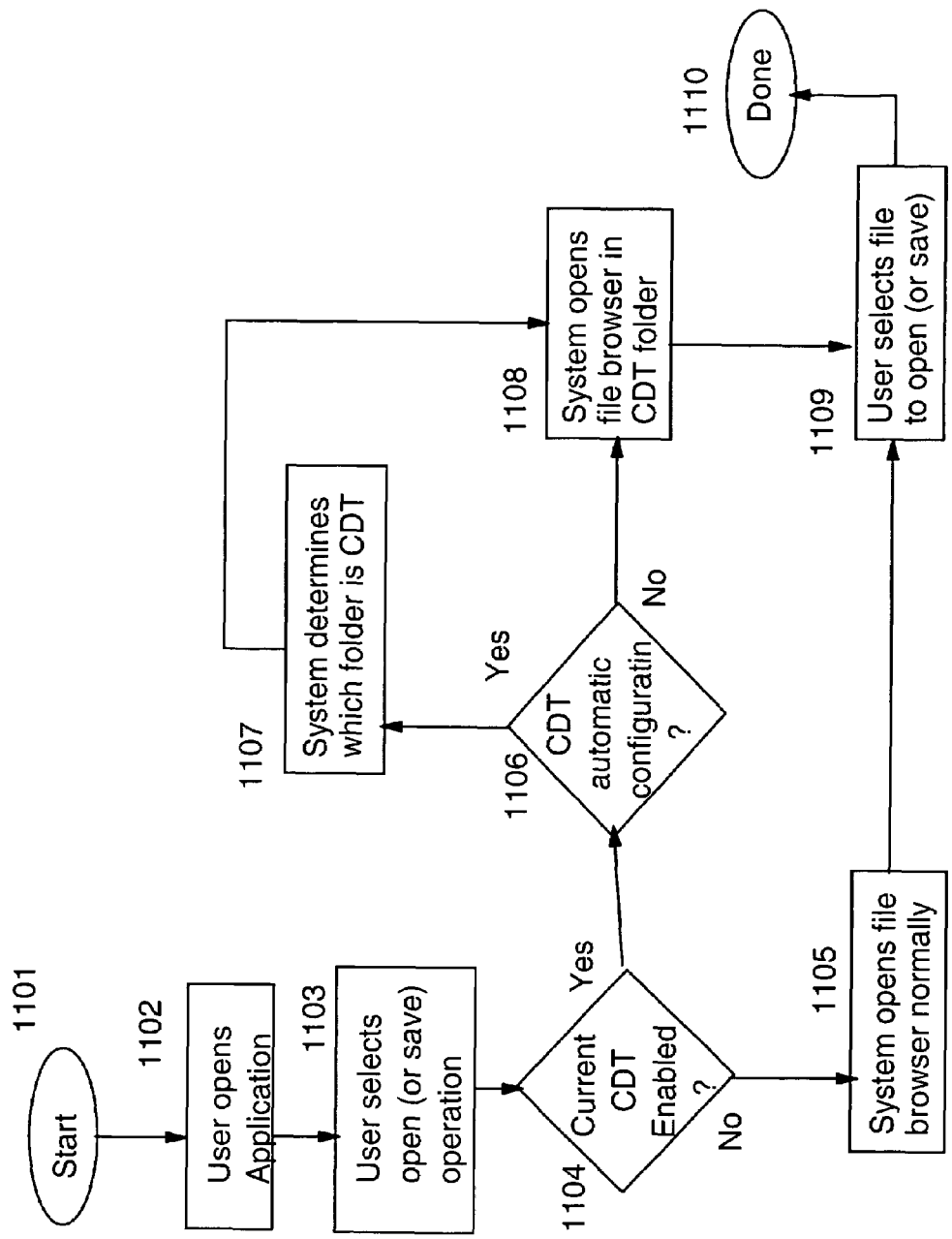
FIG. 11 depicts an example flow for managing CDT's.

FIG. 11 shows example steps for using a CDT in an open/save dialog. The user opens 1101 a particular application. The user then initiates 1103 a file open (or save) operation from the selected application. If 1104 the CDT is enabled and the automatic configuration 1106 is not configured, the system opens 1108 the file browser in the currently selected CDT. If the CDT 1104 is not enabled, the system opens the file browser normally 1105. The user preferably selects the CDT button in the browser dialog to be taken to the currently defined CDT. The user selects 1109 the file for opening (or saving)) and then is done. If the CDT is 1106 automatically configured, the system determines 1107 what the CDT folder is and then opens the browser 1108 in the newly selected CDT.

Figure 12:
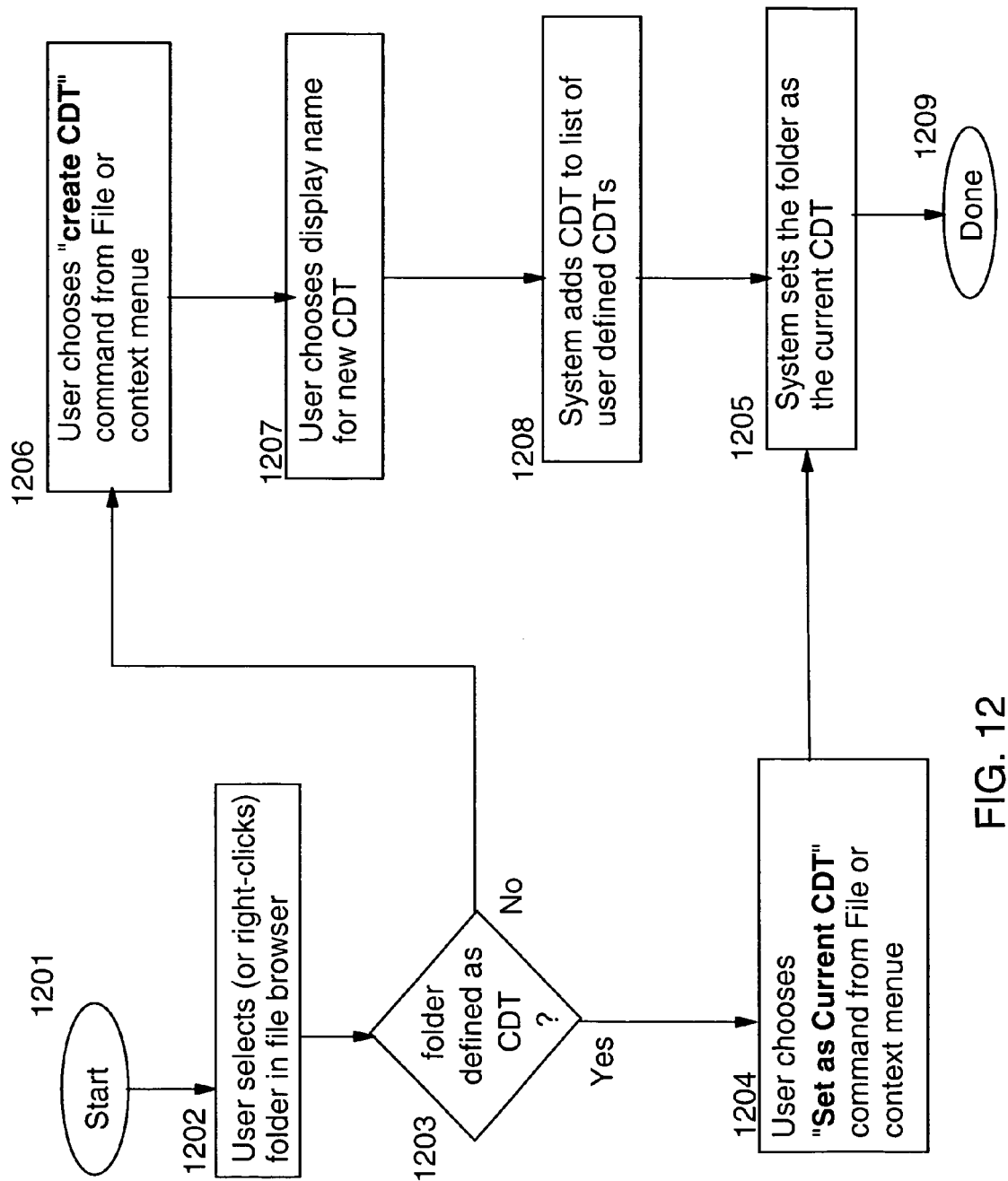
FIG. 12 depicts an example flow for managing CDT's.

FIG. 12 shows example steps for creating or setting a current CDT. The flow begins 1201 with the user selecting and right clicking on a folder in the file system 1202. If 1203 folder is already defined as a CDT, the user can choose 1204 to set the folder as the CDT. Otherwise, the user can choose 1206 to create a CDT of the selected folder. The user then chooses 1207 the name for the CDT. The system then adds 1208 the CDT to the list of defined CDTs. The system finally sets 1205 the newly defined CDT as the current CDT.

Figure 13:
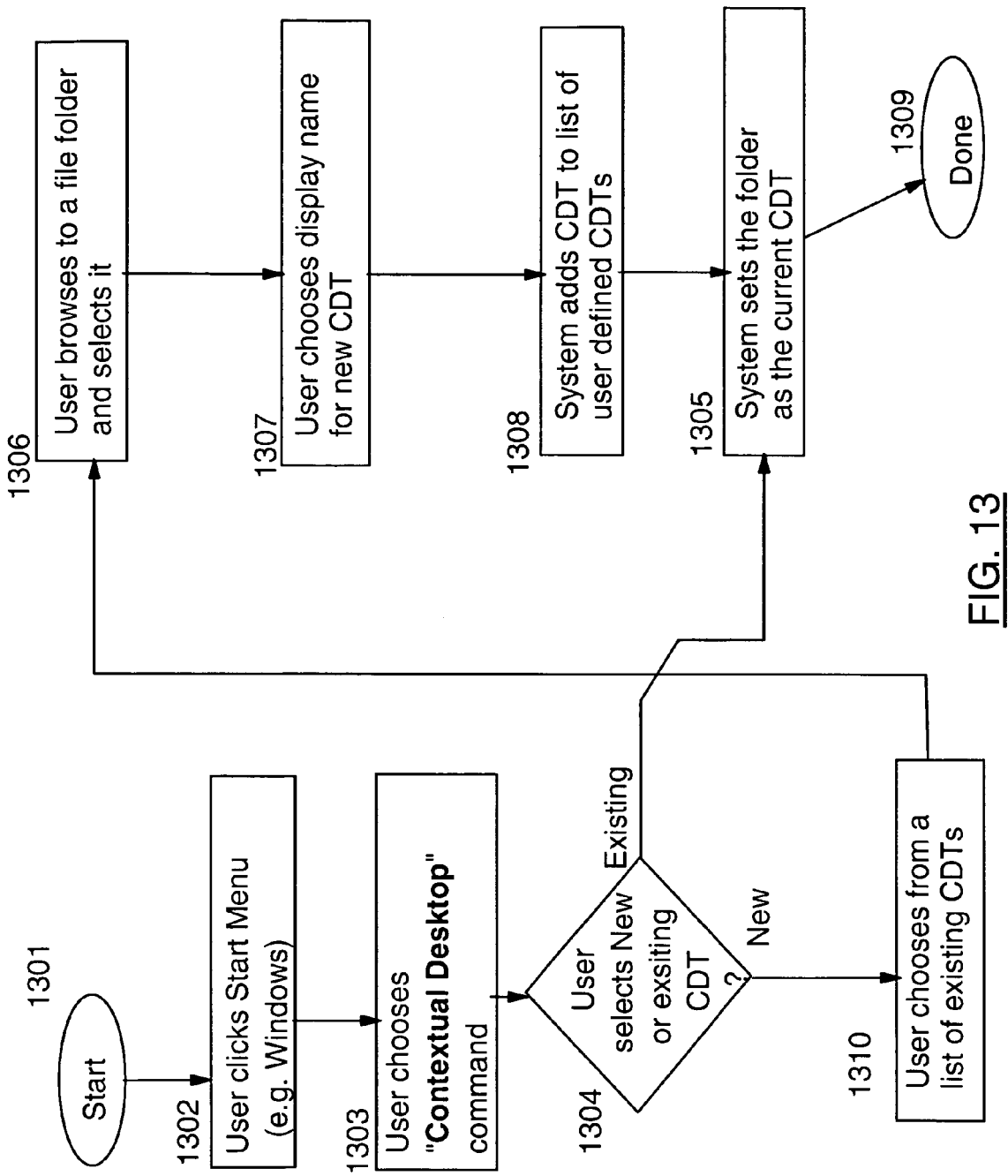
FIG. 13 depicts an example flow for managing CDT's.

FIG. 13 shows example steps for setting or creating a current CDT from a Desktop Start menu. The flow begins 1301 with the user selecting 1302 the start menu (e.g., Windows). The user selects 1303 the "Contextual Desktops" menu item. At this point the user can 1304 select an existing CDT or create a new CDT. If the user selects an existing CDT, the user chooses 1310 the previously defined CDT and the system sets 1305 it as the current CDT. If the user chooses to create a CDT, a file browser appears and the user selects 1306 a folder. The user can then choose 1307 a display name for the new CDT. The system adds 1308 the CDT to the list of defined CDTs, and then selects 1305 it as the current CDT.

While open and save dialogs have been shown as example applications of the CDT of the present invention, other useful applications including but not limited to finding files, file sharing and intra or inter-application program communication would become apparent to one versed in the art having been taught the concepts of the present invention. Such applications would be consistent with the claims of the present invention.

Thus, with the present invention, an application program that "knows" CDTs has access to a CDT made current. Such an application provides the CDT list to the user when prompting the user to select folders indicating the current CDT to the user. The application may use a selected file in the CDT as a current file when saving or opening files. In an embodiment, the CDT state is shared amongst applications such that they can cooperate in its use. For example, a file of the current CDT in use may be known as the current file in use for multiple applications. Furthermore, in an embodiment, the desktop display may show other desktops without changing which CDT is current.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. In a computer system having a display and an operating system, a method for providing a plurality of concurrent computer desktops or desktop metaphors, the method comprising:

the operating system presenting a graphical user interface (GUI) desktop representation of the plurality of desktops at the display wherein each desktop comprises a file directory and an associated GUI, the desktop representation comprising a representation of a first desktop and a representation of a second desktop;

responsive to the operating system enabling the first desktop as a default enabled desktop, the operating system directing user GUI access to a first file directory of the enabled first desktop, wherein the first file directory is based on a first desktop folder associated with the first desktop;

responsive to the first desktop being the default enabled desktop, the operating system presenting the first desktop graphical user interface (GUI) as a displayed desktop;

responsive to a first user GUI action, creating a user defined second file directory based on a first sub-folder of the first desktop folder;

making the first sub-folder a second desktop folder of the second desktop;

responsive to a user GUI second desktop enabling action enabling the second desktop as the default enabled desktop, the operating system directing user GUI access to the second file directory defined by the second desktop folder of the enabled second desktop, wherein the user GUI access comprises default file open and file save dialogs of application programs;

responsive to the second desktop being the default enabled desktop, the operating system presenting the second desktop GUI as the displayed desktop; and responsive to the second desktop being the default enabled desktop, the operating system denying user GUI access to files other than files of the second file directory.

2. The method according to claim 1, wherein the first desktop comprises a corresponding first desktop GUI for displaying representations of any one of widgets, files or folders of the first desktop, wherein the second desktop comprises a corresponding second desktop graphical user interface GUI for displaying representations of any one of widgets, files or folders of the second desktop, wherein only one of the plurality of desktops is enabled at a time as a default enabled desktop for directing user GUI access to a file directory of the default enabled desktop.

3. The method according to claim 2, wherein the presenting the desktop representation further comprises a representation of a third desktop further comprising:

responsive to a second user GUI action, creating a user defined third file directory based on a second sub-folder of the first desktop folder, the second sub-folder being a different sub-folder than the first sub-folder;

making the second sub-folder the third desktop folder;

responsive to a user GUI action comprising selecting the second sub-folder of the first desktop folder as a third desktop folder, the operating system creating the third desktop, wherein the third desktop comprises the third desktop folder; and responsive to a user GUI third desktop enabling action enabling the third desktop as the default enabled desktop; and the operating system denying user GUI access to files other than files of the third file directory defined by the desktop folder associated with the enabled desktop.

4. The method according to claim 3, wherein the GUI desktop presentation comprises a purality of GUI tabs, wherein the representation of the first desktop is a first tab widget for displaying the first desktop GUI when selected, and wherein the representation of the second desktop is a second tab widget for displaying the second desktop GUI when selected.

5. The method according to claim 2, wherein the GUI desktop representation further comprises any one of a contextual desktop separation bar, a highlighted contextual desktop, one or more tab widgets, a menu of one or more widgets or one or more icon widgets.

6. The method according to claim 2, wherein the first desktop folder comprises any one of a file, a shortcut or alias or an application program file of the computer system, wherein the second desktop folder comprises any one of a file, a shortcut or alias or an application program file of the computer system.

7. The method according to claim 2, wherein the creating the second contextual desktop folder step comprises the further steps of:

prompting the user to create a new desktop folder, by way of the GUI interface;

responsive to the GUI prompt, receiving from the user a user GUI action for making the first sub-folder the second desktop folder.

8. The method according to claim 2, further comprising:

by way of the GUI interface, receiving a user initiated GUI management directive for managing the second desktop folder, the GUI management directive consisting of any one of a file save operation, a file print operation, a file open operation, a find file operation, a make a new contextual desktop folder operation or a make current a contextual desktop folder operation; and performing the user initiated GUI management directive operation.

9. The method according to claim 2, wherein the user GUI access further comprises the default file operations of the application programs comprising any one of, a file print operation or a find file operation.

10. The method according to claim 2, comprising the further step of communicating desktop folder information of the enabled desktop between the operating system of the computer system and an application program of the computer system by way of an Application Programming Interface (API), the enabled desktop folder information identifying the file directory of the default enabled desktop.

11. The method according to claim 2, wherein contents of both the first and second desktop folders are simultaneously presented at the computer display.

12. The method according to claim 2, wherein an application program uses a system Application Programming Interface (API) to access the default enabled desktop folder and uses that folder to support the user in file dialogs, the file dialogs comprising any one of open file, save file, edit file, enable, disable or delete file.

13. The method according to claim 12, comprising the further steps of:
responsive to a user GUI enabling action, enabling a selected desktop as the enabled desktop; and
responsive to a user GUI disabling action, disabling the selected desktop whereby the file dialogs are directed to the desktop folder of an enabled desktop.

14. The method according to claim 2, wherein the contents of the desktop folder of the default enabled desktop comprise shortcuts or aliases to folders, files and application programs, thereby enabling those folders, files and application programs to be contained in multiple desktop folders simultaneously.

15. The method according to claim 1, further comprising:
responsive to a second user GUI action, creating a user defined third file directory based on a second sub-folder of the first desktop folder, the second sub-folder being a different sub-folder than the first sub-folder;
making the second sub-folder the third desktop folder;
responsive to a user GUI action comprising selecting the second sub-folder of the first desktop folder as a third desktop folder, the operating system creating a third desktop, wherein the third desktop comprises the third desktop folder;
responsive to a user GUI third desktop enabling action enabling the third desktop as the default enabled desktop; and
responsive a desktop being the enabled desktop the method comprising a) and b):
a) the operating system directing user GUI access to the file directory defined by the desktop folder associated with the enabled desktop; and
b) the operating system denying user GUI access to files other than files of the third file directory defined by the desktop folder associated with the enabled desktop.

16. A computer storage media, capable of being accessed by a processor of a computer, the storage media having software programming code for performing a method for providing a plurality of concurrent computer desktops or desktop metaphors in a computer system having a display and an operating system, the method comprising:
the operating system presenting a graphical user interface (GUI) desktop representation of the plurality of desktops at the display wherein each desktop comprises a file directory and an associated GUI, the desktop representation comprising a representation of a first desktop and a representation of a second desktop;
responsive to the operating system enabling the first desktop as a default enabled desktop, the operating system directing user GUI access to a first file directory of the enabled first desktop, wherein the first file directory is based on a first desktop folder associated with the first desktop;
responsive to the first desktop being the default enabled desktop, the operating system presenting the first desktop graphical user interface (GUI) as a displayed desktop;
responsive to a first user GUI action, creating a user defined second file directory based on a first sub-folder of the first desktop folder;
making the first sub-folder a second desktop folder of the second desktop;
responsive to a user GUI second desktop enabling action enabling the second desktop as the default enabled desktop, the operating system directing user GUI access to the second file directory defined by the second desktop folder of the enabled second desktop, wherein the user GUI access comprises default file open and file save dialogs of application programs;
responsive to the second desktop being the default enabled desktop, the operating system presenting the second desktop GUI as the displayed desktop; and
responsive to the second desktop being the default enabled desktop, the operating system denying user GUI access to files other than files of the second file directory.

17. The computer storage media according to claim 16, wherein the first desktop comprises a corresponding first desktop GUI for displaying representations of any one of widgets, files or folders of the first desktop, wherein the second desktop comprises a corresponding second desktop graphical user interface GUI for displaying representations of any one of widgets, files or folders of the second desktop, wherein only one of the plurality of desktops is enabled at a time as a default enabled desktop for directing user GUI access to a file directory of the default enabled desktop.

18. The computer storage media according to claim 17, wherein the presenting the desktop representation further comprises a representation of a third desktop further comprising:
responsive to a second user GUI action, creating a user defined third file directory based on a second sub- folder of the first desktop folder, the second sub-folder being a different sub- folder than the first sub-folder;
making the second sub-folder the third desktop folder;
responsive to a user GUI action comprising selecting the second sub-folder of the first desktop folder as a third desktop folder, the operating system creating the third desktop, wherein the third desktop comprises the third desktop folder; and
responsive to a user GUI third desktop enabling action enabling the third desktop as the default enabled desktop.

19. A computer implemented contextual desktop system for providing a plurality of concurrent computer desktops or desktop metaphors, the system comprising:
a network; and
a computer system in communication with the network the computer system comprising a processor, a storage media having software programming code, a display and an operating system, said software programming code when executed on the computer system performs a method comprising:
the operating system presenting a graphical user interface (GUI) desktop representation of the plurality of desktops at the display wherein each desktop comprises a file directory and an associated GUI, the desktop representation comprising a representation of a first desktop and a representation of a second desktop;
responsive to the operating system enabling the first desktop as a default enabled desktop, the operating system directing user GUI access to a first file directory of the enabled first desktop, wherein the first file directory is based on a first desktop folder associated with the first desktop;

responsive to the first desktop being the default enabled desktop, the operating system presenting the first desktop graphical user interface (GUI) as a displayed desktop;

responsive to a first user GUI action, creating a user defined second file directory based on a first sub- folder of the first desktop folder;

making the first sub-folder a second desktop folder of the second desktop;

responsive to a user GUI second desktop enabling action enabling the second desktop as the default enabled desktop, the operating system directing user GUI access to the second file directory defined by the second desktop folder of the enabled second desktop, wherein the user GUI access comprises default file open and file save dialogs of application programs;

responsive to the second desktop being the default enabled desktop, the operating system presenting the second desktop GUI as the displayed desktop; and responsive to the second desktop being the default enabled desktop, the operating system denying user GUI access to files other than files of the second file directory.

20. The system according to claim 19, wherein the first desktop comprises a corresponding first desktop GUI for displaying representations of any one of widgets, files or folders of the first desktop, wherein the second desktop comprises a corresponding second desktop graphical user interface GUI for displaying representations of any one of widgets, files or folders of the second desktop, wherein only one of the plurality of desktops is enabled at a time as a default enabled desktop for directing user GUI access to a file directory of the default enabled desktop.

* * * * *